(12) United States Patent
Niguchi et al.

(10) Patent No.: US 7,595,577 B2
(45) Date of Patent: Sep. 29, 2009

(54) BRUSHLESS MOTOR AND ELECTRIC POWER STEERING APPARATUS INCORPORATING THE SAME

(75) Inventors: Noboru Niguchi, Nara (JP); Hirohide Inayama, Nara (JP); Naotake Kanda, Nara (JP); Masaru Horikawa, Nara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 11/861,752

(22) Filed: Sep. 26, 2007

(65) Prior Publication Data

US 2008/0073995 A1 Mar. 27, 2008

(30) Foreign Application Priority Data

Sep. 26, 2006 (JP) ............................. 2006-260023

(51) Int. Cl.
*H02K 1/00* (2006.01)
(52) U.S. Cl. ...................................................... 310/216
(58) Field of Classification Search ................ 310/216, 310/254, 156.01
See application file for complete search history.

(56) References Cited

U.S. PATENT DOCUMENTS 6,822,364 B2 * 11/2004 Suzuki et al. ............... 310/218
2006/0006749 A1 * 1/2006 Sasaki et al. ............... 310/68 R

FOREIGN PATENT DOCUMENTS

EP 0 314 860 * 3/1988
JP 2001-275325 10/2001

* cited by examiner

*Primary Examiner*—Hanh N Nguyen
(74) *Attorney, Agent, or Firm*—Darby & Darby PC

(57) ABSTRACT

A brushless motor includes an annular stator and a rotor which has a plurality of permanent magnets alternately arranged in circumferential direction on the rotor to form poles and which is disposed within the stator to be rotatable with respect to the stator. The stator includes a cylindrical yoke and a plurality of teeth which are same in size one another, are connected to the yoke to extend therefrom toward the rotor, and are disposed at even interval in the circumferential direction. Width of each of the teeth in the circumferential direction is set to be greater than or at a vicinity of the value which is obtained by dividing outer diameter of the rotor by the number of the teeth and multiplying the result of dividing by π/2.

11 Claims, 8 Drawing Sheets

BRUSHLESS MOTOR AND ELECTRIC POWER STEERING APPARATUS INCORPORATING THE SAME

INCORPORATION BY REFERENCE

This application is based on and claims priority under U.S.C. §119 with respect to Japanese patent application No. 2006-260023, entire contents of which are incorporated herein by reference in its entirety.

FIELD OF THE INVENTION

The present invention relates to a brushless motor provided with a permanent magnet for forming a magnetic field and also relates to an electric power steering apparatus, which applies steering assist force to a steering mechanism in a vehicle, incorporating a brushless motor.

BACKGROUND OF THE ART

Conventionally employed is an electric power steering apparatus for applying steering assist force to a steering mechanism by driving an electric motor, such as a brushless motor, in accordance with steering torque imparted to a steering wheel (handle) by a driver.

A permanent-magnet motor, which includes a stator around which a coil is wound and a rotor provided with a permanent magnet, are used as a brushless motor incorporated in the conventional electric power steering apparatus in many cases. The permanent-magnet motor may be suffered from cogging torque. The cogging torque is caused by a magnetic attraction force between a core of the stator and a magnetic pole (magnet) of the rotor in the state where electric current is not supplied to the coil of the stator.

The foregoing cogging torque causes deterioration of steering feeling in the electric power steering apparatus. Accordingly, various attempts have been performed to reduce magnitude of the cogging torque. For example, it is known that the cogging torque is reduced by appropriately defining the number of the poles of the permanent magnets and the number of poles (teeth) provided in the stator. The number of the poles (teeth) in the stator is also referred to as slot number because this number is same as the number of spaces (slots) interposed between two adjacent poles (teeth).

An 8poles-9slots type electric motor, which includes eight poles in a rotor and nine slots in a stator, is incorporated in an electric power steering apparatus. Such power steering apparatus is described in non-examined Patent Publication JP 2001-275325, for example. A 10poles-12slots type electric motor, which includes ten poles in a rotor and twelve slots in a stator, is also widely incorporated in electric power steering apparatuses. These electric motors can be manufactured at relatively low cost and be small in size thereby being applicable to the electric power steering apparatuses.

However, further reduction of the cogging torque is anticipated to improve the steering feeling in the power steering apparatus. In order to achieve the further reduction of the cogging torque, it is required to change the structure and scale of the poles (teeth). In case that the width of each of poles (teeth) is set to extremely small, reduction of the cogging torque is not expected, because the width of each of the poles corresponds to width of magnetic path through which magnetic flux from the pole of permanent magnet passes.

SUMMARY OF THE INVENTION

The present invention aims to provide a brushless motor capable of reducing cogging torque by appropriately set tooth width (width of each of teeth) and also to provide an electric power steering apparatus incorporating the same.

In order achieve the foregoing and other objects, according to one aspect of the invention, provided is a brushless motor including an annular stator and a rotor which has a plurality of permanent magnets alternately arranged in circumferential direction on the rotor to form poles and which is disposed within the stator to be rotatable with respect to the stator. The stator includes a cylindrical yoke and a plurality of teeth which are same in size one another, are connected to the yoke to extend therefrom toward the rotor, and are disposed at even interval in the circumferential direction. Width of each of the teeth in the circumferential direction is set to be greater than or at a vicinity of the value which is obtained by dividing outer diameter of the rotor by the number of the teeth and multiplying the result of dividing by $\pi/2$.

Further, according to another aspect of the invention, provided is an electric power steering apparatus comprising a steering device and a steering mechanism. The power steering apparatus further comprises the aforementioned brushless motor. The brushless motor is driven in response to operation of the steering device for steering thereby applying steering assist force to the steering mechanism.

DETAILED DESCRIPTION OF THE PREFERRED EMBODIMENT

A preferred embodiment of the present invention will be explained below with reference to Figures.

1. Overall Structure

Figure 1:
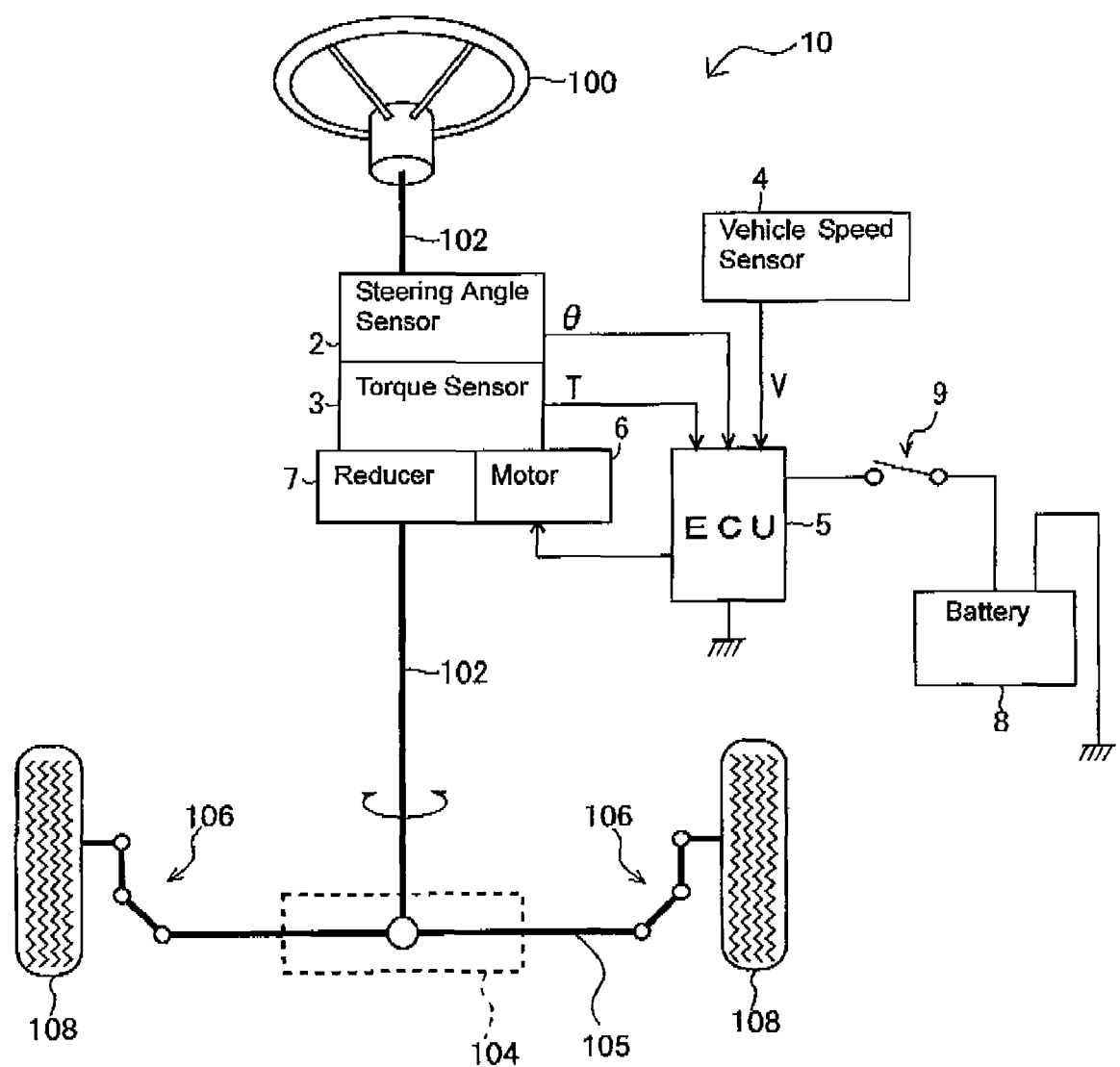
FIG. 1 is a schematic view of an electric power steering apparatus according to an embodiment of the present invention with associated parts.

FIG. 1 is a schematic view of an electric power steering apparatus 10 according to an embodiment of the present invention with associated parts. The electric power steering apparatus 10 includes a steering shaft 102, a rack-and-pinion mechanism 104, a steering angle sensor 2, a torque sensor 3, a brushless motor 6, a reducer 7 and an ECU (electronic control unit) 5. One end of the steering shaft 102 is connected to a handle (a steering wheel) 100 serving as a steering device for steering, and the other end of the steering shaft 102 is coupled with the rack-and-pinion mechanism 104. The steering angle sensor 2 is provided for detecting steering angle indicating rotating position of the handle 100. The torque sensor 3 is provided for detecting steering torque applied to the steering shaft 102 by operation of the handle 100. The brushless motor 6 is configured to generate steering assist force for lowering driver's burden to operate the handle 100, i.e. driver's burden for the steering operation. The reducer 7 transmits the steering assist force from the motor 6 to the steering shaft 102. The ECU 5 receives electric power from a battery 8 through an ignition switch 9, and controls the driving of the motor 6 based on sensor signals from the steering angle sensor 2, the torque sensor 3, a vehicle speed sensor 4 and the like.

In a vehicle on which the electric power steering apparatus 10 is mounted, the steering torque and the steering angle are respectively detected by the torque sensor 3 and the steering angle sensor in response to the operation of the handle 100 by the driver. The motor 6 is driven by the ECU 5 in accordance with the detected steering torque and steering angle as well as vehicle speed detected by the vehicle speed sensor 4. The motor 6 then generates the steering assist force, which is applied to the steering shaft 102 through the reducer 7, whereby the driver's burden of steering operation is lowered. In other words, sum (resultant torque) of the steering torque by the driver's steering operation and torque derived from the steering assist force generated by the motor 6 is applied to the rack-and-pinion mechanism 104 as an output torque via the steering shaft 102 so as to rotate a pinion shaft (not shown). When the pinion shaft is rotated, the rotation of the pinion shaft is converted into reciprocating movement of a rack shaft 105 by the rack-and-pinion mechanism 104. The both ends of the rack shaft 105 are respectively connected to corresponding vehicle wheels 108 via connection members 106, whereby directions of the vehicle wheels 108 are turned in response to the reciprocating motion of the rack shaft 105. Each of the connection members 106 is configured by a tie rod and a knuckle arm.

2. Configuration of the Brushless Motor

Figure 2:
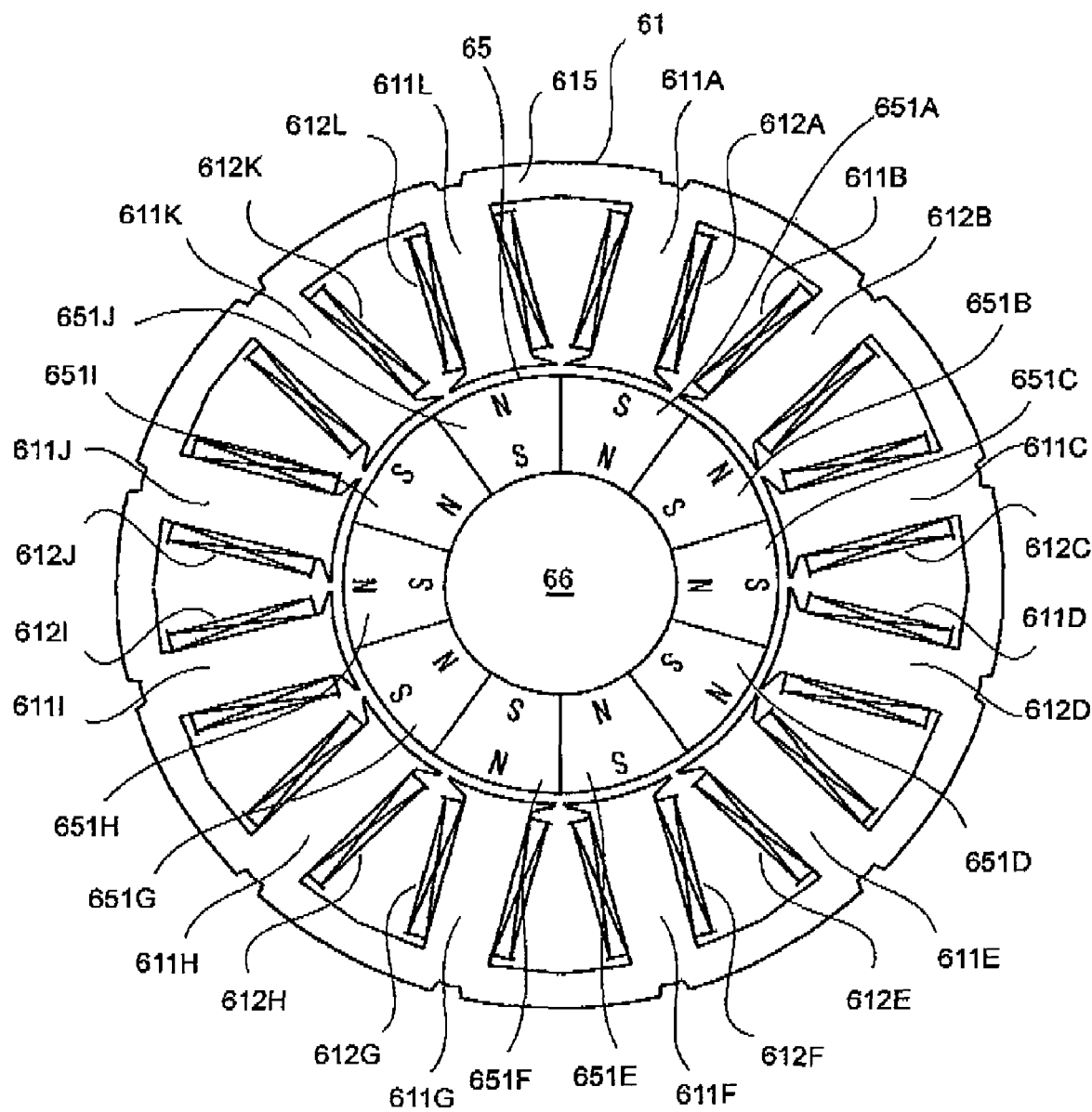
FIG. 2 is a sectional view of a brushless motor in the embodiment taken perpendicular to a rotation axis of the same.

FIG. 2 is a sectional view of the brushless motor 6 in the embodiment taken perpendicular to a rotation axis of the same. As shown in FIG. 2, the motor 6 includes a rotor 65 rotating together with a motor shaft 66, which corresponds to the rotation axis of the motor 6, and an annular stator 61 surrounding the rotor 65 with interposing certain clearance (air gap) therebetween.

The stator 61 includes a cylindrical yoke 615 and twelve teeth (poles) 611A to 611L protruding from an inner circumference surface of the yoke 615 toward the motor shaft 66. Coils 612A to 612L are wound around the corresponding teeth 611A to 611L. In response to the application of electric current to the coils 621A to 612L, the teeth 611A to 611L of the stator 61 function as twelve poles, which are provided in the circumferential direction at even interval.

Specifically, the coils 612A to 612L are divided in to three groups, each of which consists of four coils. The coils 612A to 612L are so connected to three phase electric power source or drive circuit that one group of coils is driven by U-phase current, another group of coils is driven by V-phase current and the other group of coils is driven by W-phase current. Such connection is achieved by employing Y-connection, for example. The three phase electric power source or drive circuit controls the rotation of the motor 6 by outputting PWM (pulse width modulation) signals, which are electric voltage signals corresponding to respective phases and controlled in width of pulse.

On an outer circumference surface of the rotor 65, ten permanent magnets 651A to 651J are disposed to form ten poles in the circumferential direction. The permanent magnets 651A to 651J are, for example, rare metal neodymium (Nd) permanent magnets, which are magnetized in radial direction (the direction perpendicular to the rotation axis of the rotor 65) and are disposed so that the N-poles and S-poles are alternately arranged in the circumferential direction.

Accordingly, the motor 6 of this embodiment is a 10poles-12slots type electric motor. In other words, the stator 61 includes twelve teeth and the permanent magnets 651A to 651J form ten magnetic poles. The motor of this type is well known as being able to reduce and suppress the cogging torque in comparison with a general 8poles-12slots type electric motor, which shows that the ratio of pole to slot is 2 to 3 (pole:slot=2:3).

Figure 3:
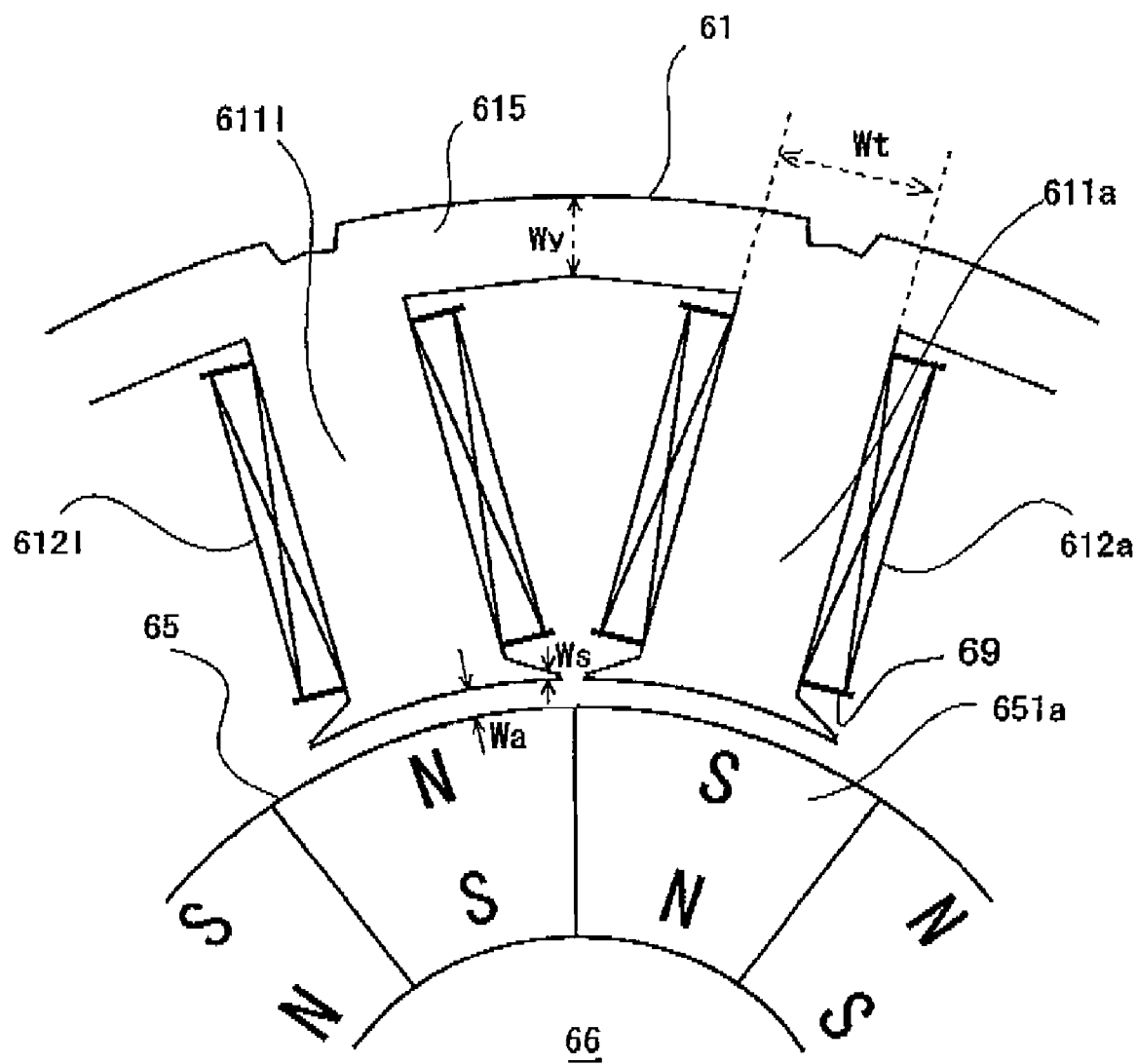
FIG. 3 is an enlarged sectional view of a principal part of the brushless motor in the embodiment.

FIG. 3 is an enlarged sectional view of a principal part of the yoke 615 and teeth 611 in the brushless motor 6. As shown in FIG. 3, the coil 612A is wound around the tooth 611A, for example. Specifically, the coil 612A is wound around a cylindrical bobbin 69 having a guard portion at one axial end thereof and then a regulating plate is press fitted at the other axial end of the bobbin 69. The bobbin 69 with the coil 612A is externally fitted onto the outer periphery of the tooth 611A, whereby the state in which the coil 612A is wound around the tooth 611A is attained. By repeating the similar work, the coils 612A to 612L are wound around the teeth 611A to 611L, respectively. The aforementioned winding way may be called as concentrated winding or pole winding. A portion of Coil that does not form effective magnetic flux is sufficiently eliminated by adopting the concentrated winding in comparison with adopting distributed winding, in which the coil of certain phase is wound around multiple teeth with distributed. Thus, According to the concentrated winding, a copper loss is suppressed, thereby acquiring a brushless motor of high output power capable of being incorporated in the electric power steering apparatus.

3. Calculation Method for the Tooth Width and the Like

As shown in FIG. 3, each of the teeth 611A to 611L has two tip portions protruding toward the circumferentially opposing direction from an inner end of tooth which faces with the rotor 65. Assuming that distance (width) between two opposing surfaces of the each of teeth 611A to 611L is tooth width Wt, thickness of the tip portion at the circumferential end thereof is tip width Ws, distance between the tip and the rotor 65 is air gap Wa and thickness (width) of the yoke 615 in the radial direction is yoke width Wy, preferable calculation method of tooth width Wt for restraining the cogging torque will be described as follows.

In the motor 6 of the present embodiment, outer diameter of the stator 61 is 80 mm (millimeter), outer diameter of the rotor 65 is 50 mm, length (thickness) of each of the permanent magnets 651A to 651J in radial direction is 3 mm, the air gap Wa is 0.5 mm, and phase resistance is set to be equal to or less than 25 mΩ. The tip width Ws may be set about 2.5 mm for trouble-free operation of the motor 6, but it is preferable to set the tip width Ws about 0.5 mm. In case that the tip width Ws is set to relatively large value around 0.5 mm or greater, the magnitude and fluctuation range of the cogging torque are suppressed to be smaller than the case in which the tip width Ws is set relatively small value such as 0.25 mm or the vicinity thereof.

Figure 4:
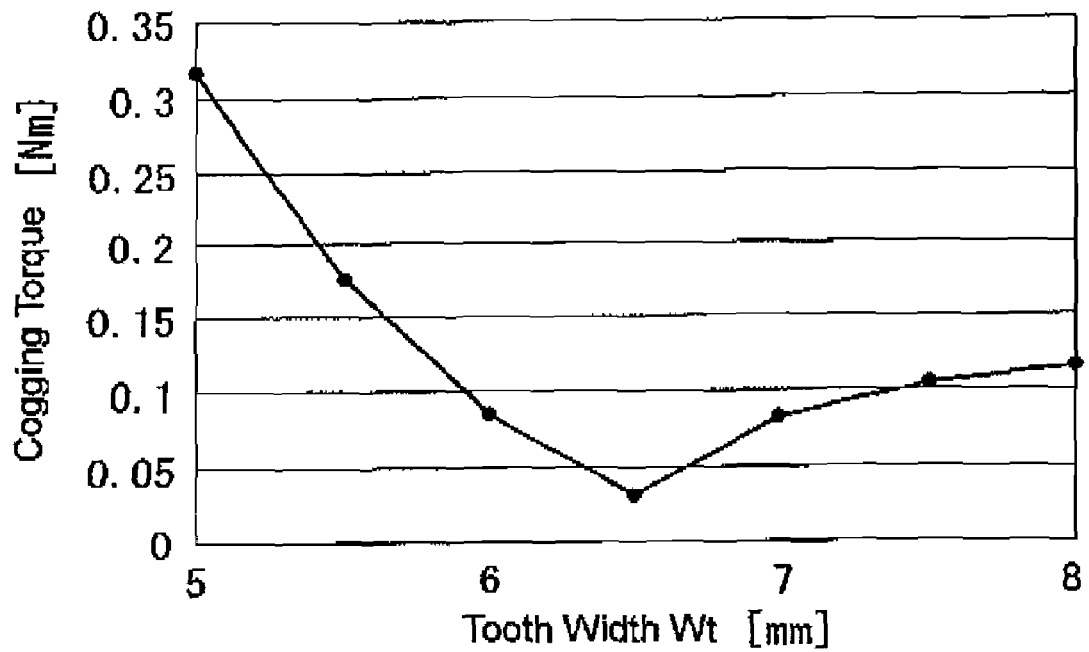
FIG. 4 is a graph showing property of cogging torque in case that tooth width is varied from 5 mm (millimeter) to 8 mm in the embodiment.

FIG. 4 is a graph showing property of the cogging torque in case that the tooth width Wt is varied from 5 mm to 8 nm. These values of the cogging torque are obtained as the result of the known simulation method. Therefore, such result is obtained by inputting the necessary values into a commercially available simulation software. Here, the yoke width Wy and the tooth width Wt are set to the same value because the value of output torque is affected by the ratio between the yoke width Wy and the tooth width Wt as mentioned later. In other word, the yoke width Wy is set to be the same as the tooth width Wt, which varies as mentioned above.

As shown in FIG. 4, the cogging torque indicates the smallest value when the tooth width Wt is se about 6.5 mm. This setting value (6.5 mm) is approximately same as the value that is obtained by dividing the outer diameter (50 mm) of the rotor 65 by the slot number (12) and multiplying the result of the dividing by r/2. This means that the tooth width Wt and the distance between adjacent two teeth in the teeth 611A to 611L are substantially same at the region where they are approximately tangent to the outer circumference of the rotor 65. The distance between the adjacent two teeth is the width of air gap formed between the adjacent two teeth with omitting the tip portions. The distance is referred to as tooth-to-tooth air gap width.

More precisely, when the air gap Wa is considered, the sum of the teeth width Wt and the tooth-to-tooth air gaps width in full circle (the sum considering the slot number, i.e. 12) is slightly larger than the outer circumferential length of the rotor 65. Thus, the tooth width Wt corresponding to the smallest cogging torque is slightly larger than the value obtained by dividing the outer diameter of the rotor 65 by the slot number (12) and multiplying the result of the dividing by π/2.

The reason for the fact that the cogging torque is suppressed by setting the tooth width Wt as mentioned above is assumed as follows.

One of the twelve teeth 611A to 611L approaches to one of the ten permanent magnets 651A to 651J once in the singe rotation of the rotor 65. With regard to one (e.g. the tooth 611A) of teeth and one (e.g. the permanent magnet 651A) of permanent magnets approaching each other, when the center of the tooth 611A corresponds to the center of the permanent magnet 651A in the circumferential direction, the magnetic flux from the permanent magnet 651A is smoothly transmitted to the tooth 611A. In this case, if the relationship only between the tooth 611A and the permanent magnet 651A is focused, magnetic attraction force between them becomes largest and torque becomes smallest.

On the other hand, the one tooth magnetically apart from the one certain permanent magnet at maximum distance, that is, when the middle (center) of the air gap between the tooth 611A and adjacent tooth (e.g. the tooth 611B) corresponds to the center of the permanent magnet 651A in the circumferential direction, the magnetic flux from the permanent magnet 651A is most hardly to be transmitted to the tooth 611A. In this case, if the relationship only between the tooth 611A and the permanent magnet 651A is focused, the magnetic attraction force between them becomes smallest and the torque becomes largest.

In this manner, the change in which the magnetic attraction force alternately becomes largest and smallest is repeated in the rotation of the motor shaft 66. However, this change does not directly lead the pulsation, i.e. the cogging torque, in the output torque of the motor 6. There is need to consider where respective centers of ten permanent magnets 651A to 651J are located in the circumferential direction with respect to the corresponding teeth or the air gaps between the corresponding adjacent teeth (two adjacent teeth in the teeth 611A to 611L). With considering this, the relation ship between the permanent magnets and the corresponding teeth or air gaps differs one another in series of the circumferential direction by the distance obtained by dividing the circumferential length between the centers of two adjacent teeth by 10 (the number of the permanent magnets). Thus, in case that the tooth width Wt is approximately equal to the tooth-to-tooth air gap width as this embodiment, the state is always (alternatively) established in which centers of five (i.e. half of the total number) permanent magnets among the ten permanent magnets 651A to 651J locate at the centers of the corresponding teeth 611A to 611L and in which centers of the other five (remaining half) permanent magnets locate the centers of the corresponding tooth-to-tooth air gap between the adjacent two teeth. Accordingly, even if the torque (the magnetic attraction force) generated between each of the permanent magnets and corresponding tooth varies, the sum of torque generated by the permanent magnets 651A to 651J is small in its change. In view of this, the cogging torque is hardly to be generated or does not become large with the configuration of the embodiment.

As described above, it is understood that the cogging torque become smallest in case that the tooth width Wt is approximately equal to the tooth-to-tooth air gap width. Further, as shown in FIG. 4, the cogging torque is suppressed in case that the tooth width Wt is set to greater than the tooth-to-tooth air gap width in comparison to the case that the same is set to smaller than the tooth-to-tooth air gap width. The reason is as follows. When the tooth width Wt is greater than the tooth-to-tooth air gap width, the condition in which the magnetic flux from the permanent magnet is smoothly transmitted to the tooth continues for long period, whereby the cogging torque does not become large. On the other hand, when the tooth width Wt is smaller than the tooth-to-tooth air gap width, the condition in which the magnetic flux from the permanent magnet is smoothly transmitted to the tooth is maintained only for short period, whereby the cogging torque relatively tends to become large.

Thus, in order to suppress the cogging torque of the brushless motor 6, it is preferable to set the tooth width Wt to be greater than or around the value which is obtained by dividing the outer diameter of the rotor by the slot number and multiplying the result of the dividing by π/2. More preferably, the tooth width Wt is set to be around the value, that is, the value Wtv obtained by the following formula.

Formula;

$$(Wtv) = [(\text{outer diameter of rotor})/(\text{slot number})] * \pi/2$$

Figure 5:
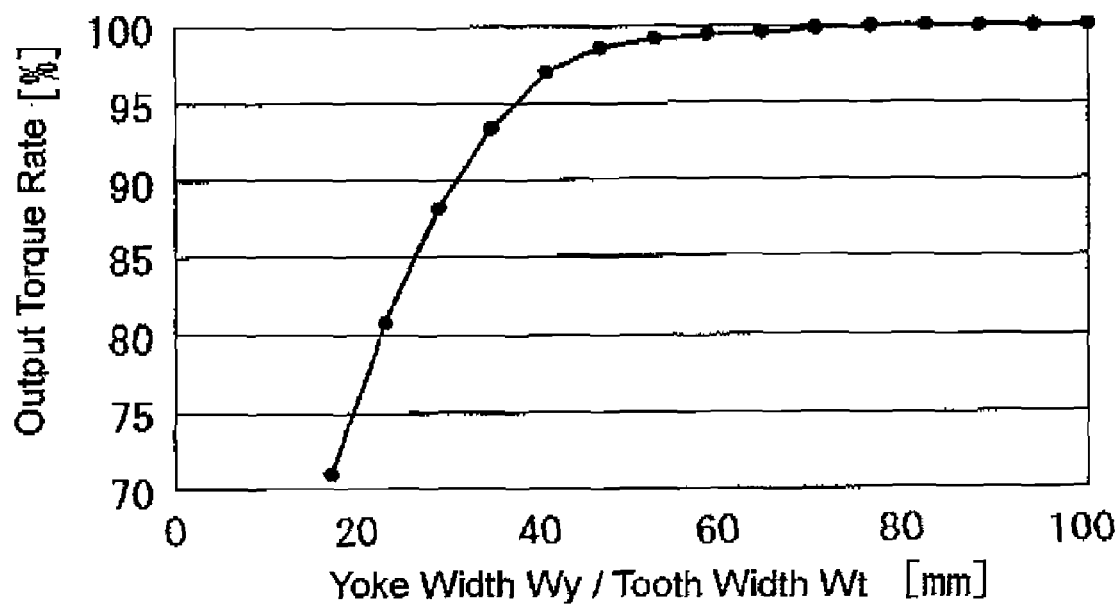
FIG. 5 is a graph showing property of output torque rate in case that ratio of yoke width with respect to tooth width is varied in the embodiment.

With reference to FIG. 5, explanation will be made to the change in the output torque of the motor 6 in case that the ratio between the tooth width Wt and yoke width Wy is varied. FIG. 5 is a graph showing property of the output torque rate in case that the ratio of the yoke width Wy with respect to the tooth width Wt is varied. The output torque rate represents the ratio of the output torque with respect to maximum output torque.

As shown in FIG. 5, the output torque rate indicates 100% when the ratio of the yoke width Wy relative to the tooth width Wt is approximately 100%, and the output torque rate shows about 98% when the ratio is approximately 45%. Accordingly, the deterioration of the output torque rate can be omitted in the range that the ratio of the yoke width Wy with respect to the tooth width Wt is not less than 45%. However, if the ratio become smaller than 45% or further, the output torque rate is considerably deteriorated. Thus, in order to prevent the output torque of the motor 6 from deteriorating, it is preferable to set the ratio of the yoke width Wy with respect to the teeth with Wt to be greater than the proximity of 45%. In other words, the yoke width Wy is preferable to be equal to or greater than 45% of the tooth width Wt.

4. Advantages

According to the aforementioned embodiment, by setting the tooth width Wt to be greater than or at the vicinity of the value obtained by dividing the outer diameter of the rotor by slot number and multiplying the result of the dividing by $\pi/2$, preferably by setting the tooth width Wt at the vicinity of the value, the brushless motor with the suppressed cogging torque and the electric power steering apparatus incorporating such motor can be provided.

5. MODIFIED EXAMPLE 5-1 Example 1

Figure 6:
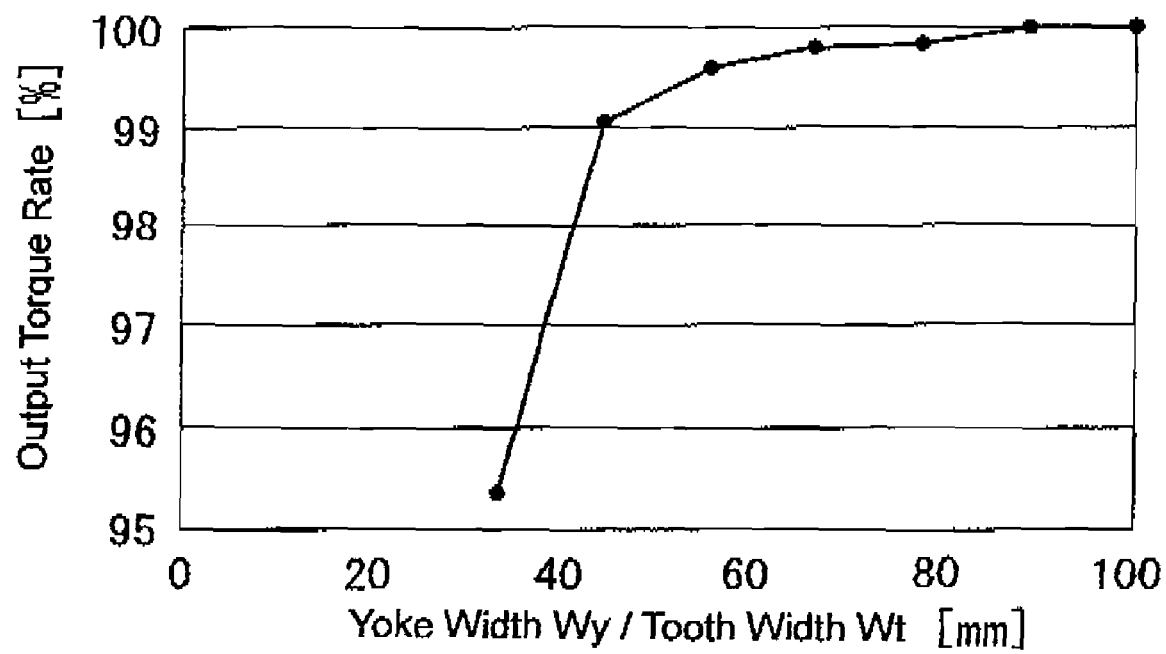
FIG. 6 is a graph showing property of output torque rate in case that ratio of yoke width with respect to toot width is varied in an 8pole-9slot type brushless motor, which is a modified example of the embodiment.

The brushless motor 6 of the embodiment is 10poles-12slots type and, as shown in FIG. 5, it is preferable to set the ratio of the yoke width Wy relative to the tooth width Wt to be equal to or around 45%. This tendency is widely applicable to the brushless motor whose slot number is greater than the pole number. With reference to FIG. 6, additional explanations will be made.

FIG. 6 is a graph showing property of the output torque rate in case that the ratio of the yoke width Wy with respect to tooth width Wt is varied in an 8poles-9slots type brushless motor. As shown in FIG. 6, the output torque rate indicates 100% when the ratio of the yoke width Wy relative to the tooth width Wt is approximately 100% and the output torque rate shows about 99% when the ratio of the yoke width Wy relative to the tooth width Wt is approximately 45%. Accordingly, the deterioration of the output torque rate can be omitted in the range that the rate of the yoke width Wy relative to the tooth width Wt is not less than 45%. However, if the ratio becomes smaller than 45% or further, the output torque rate is considerably deteriorated. This deterioration is more remarkable with compared to that shown in FIG. 5. Thus, in order to prevent the output torque of the brushless motor 6 from deteriorating, it is preferable to set the ratio of yoke width WY with respect to the teeth with Wt to be greater than the proximity of 45%. In other words, the yoke width Wy is equal to or greater than 45% of the tooth width Wt. This result in FIG. 6 is similar to the result of the embodiment. These results are applicable to brushless motors whose pole number and slot number is suitable for practical use and whose slot number is greater than the pole number.

Figure 7:
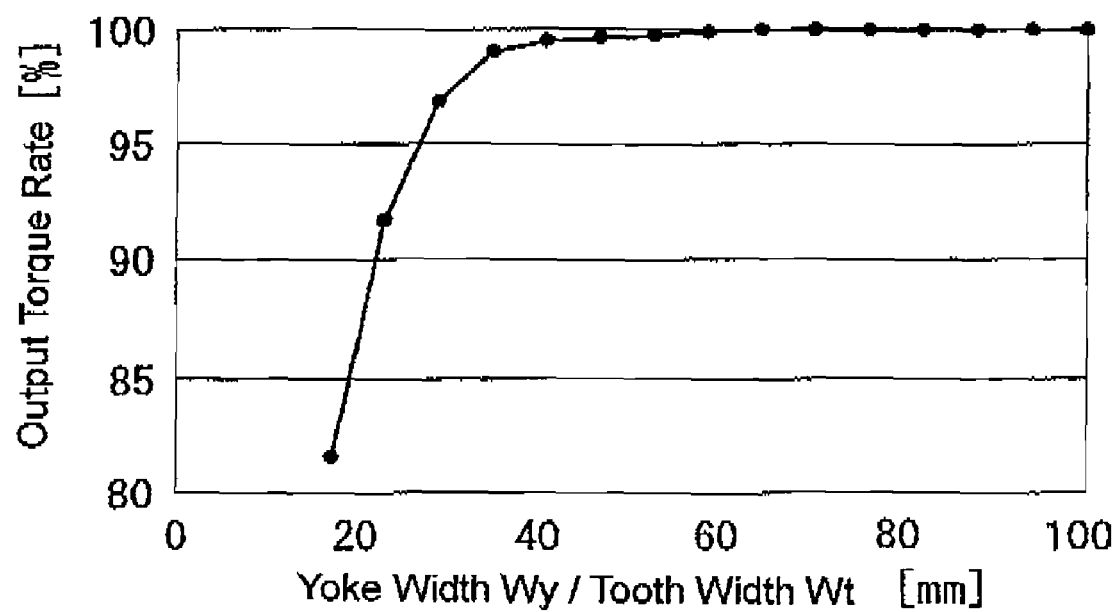
FIG. 7 is a graph showing property of output torque rate in case that ratio of yoke width with respect to tooth width is varied in a 14pole-12slot type brushless motor, which is another modified example of the embodiment.
Figure 8:
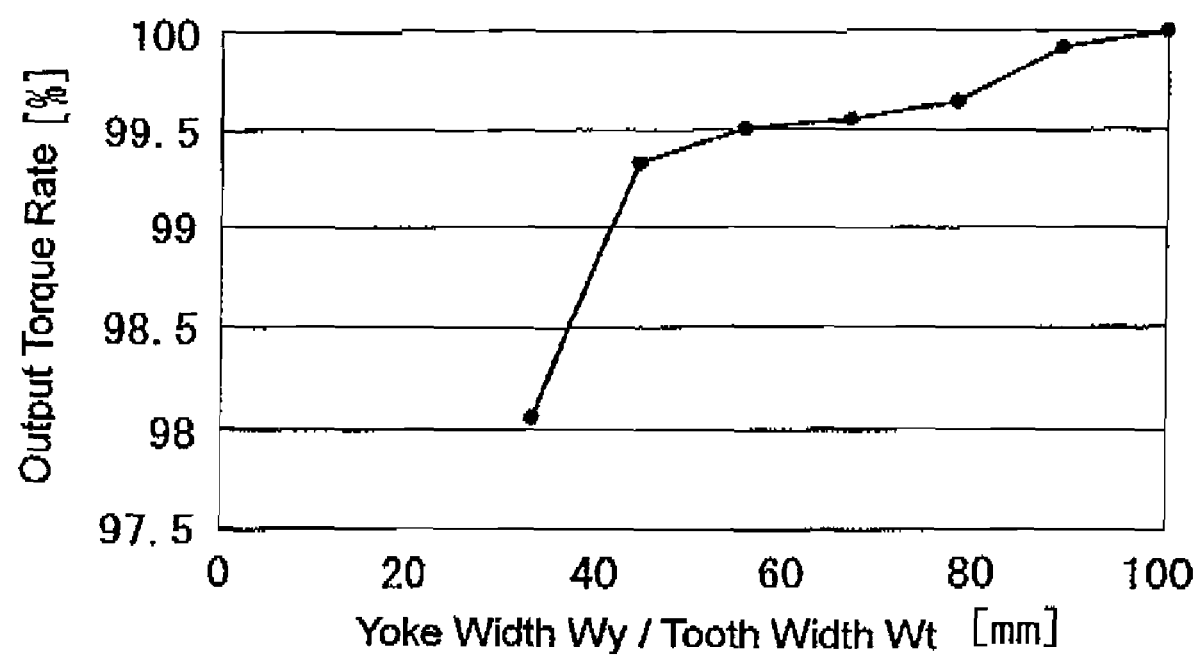
FIG. 8 is a graph showing property of output torque rate in case that ratio of yoke width with respect to tooth width is varied in a 10pole-9slot type brushless motor, which is a further modified example of the embodiment

On the other hand, in case of the motor whose slot number is smaller than its pole number, the ratio of the yoke width Wy with respect to the tooth width Wt which is preferable for suppressing the deterioration of the torque differs from the ratio described with reference to FIGS. 5 and 6. With reference to FIGS. 7 and 8, details are explained as follows.

FIG. 7 is a graph showing property of the output torque rate in case ratio of the yoke width Wy with respect to the tooth width Wt is varied in a 14poles-12slots type brushless motor. As shown in FIG. 7, the output torque rate indicates 100% when the ratio of the yoke width Wy relative to the tooth width Wt is approximately 100%, and the output torque rate shows about 98% when the ratio is approximately 35%. Accordingly, the deterioration of the output torque rate can be omitted in the range where the ratio of the yoke width Wy with respect to the tooth width Wt is not less than 35%. However, the ratio decreases to be smaller than this value (35%), the output torque rate considerably decreases as the ratio decreases. Thus, in order to prevent the output torque of the brushless motor 6 from deteriorating, it is preferable that the ratio of the yoke width Wy relative to the tooth width Wt is set to be greater than the proximity of 35%. In other words, the yoke width Wy is preferable to be equal to or greater than 35% of the tooth width Wt.

Figure 9:
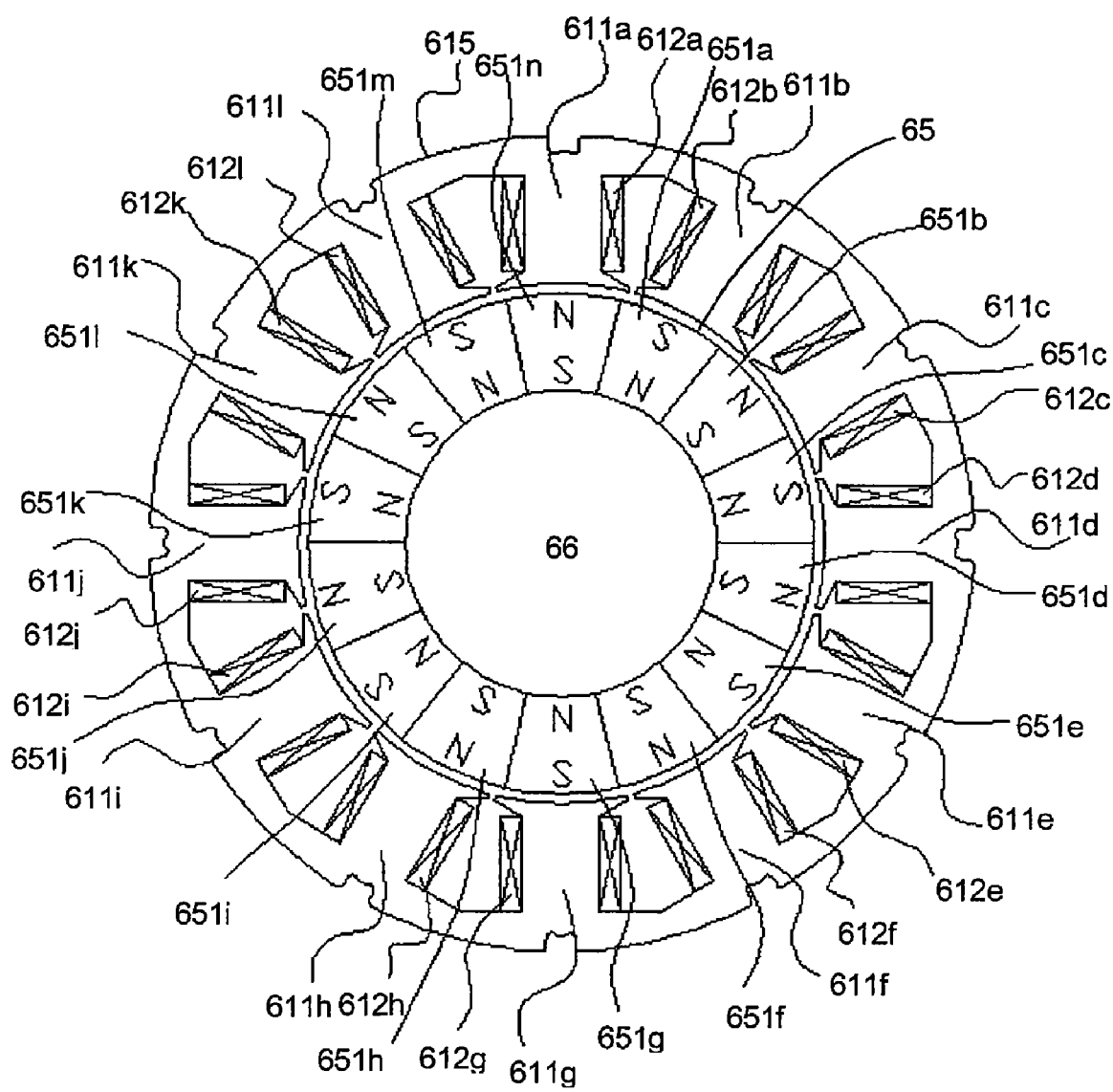
FIG. 9 is a sectional view of a brushless motor of the embodiment of FIG. 7 taken perpendicular to a rotation axis of the same.

FIG. 9 is a sectional view of the brushless motor 6 in the embodiment of FIG. 7, taken perpendicular to a rotation axis of the same. As shown in FIG. 9, the motor 6 includes a rotor 65 rotating together with a motor shaft 66, which corresponds to the rotation axis of the motor 6, and an annular stator 61 surrounding the rotor 65 with interposing certain clearance (air gap) therebetween.

The stator 61 includes a cylindrical yoke 615 and twelve teeth (poles) 611A to 612L protruding from an inner circumference surface of the yoke 615 toward the motor shaft 66. Coils 612A to 612L are wound around the corresponding teeth 611A to 611L. In response to the application of electric current to the coils 621A to 612L, the teeth 611A to 611L of the stator 61 function as twelve poles, which are provided in the circumferential direction at even intervals.

Specifically, the coils 61 2A to 61 2L are divided in to three groups, each of which consists of four coils. The coils 612A to 612L are so connected to three phase electric power source or drive circuit that one group of coils is driven by U-phase current, another group of coils is driven by V-phase current and the other group of coils is driven by W-phase current. Such connection is achieved by employing Y-connection, for example. The three phase electric power source or drive circuit controls the rotation of the motor 6 by outputting PWM (pulse width modulation) signals, which are electric voltage signals corresponding to respective phases and controlled in width of pulse.

On an outer circumference surface of the rotor 65, fourteen permanent magnets 651A to 651N are disposed to form ten poles in the circumferential direction. The permanent magnets 651A to 651N are, for example, rare metal neodymium (Nd) permanent magnets, which are magnetized in radial direction (the direction perpendicular to the rotation axis of the rotor 65) and are disposed so that the N-poles and S-poles are alternately arranged in the circumferential direction.

Accordingly, the motor 6 of this embodiment is a 14poles-12slots type electric motor. In other words, the stator 61 includes twelve teeth and the permanent magnets 651A to 651M form fourteen magnetic poles.

Figure 10:
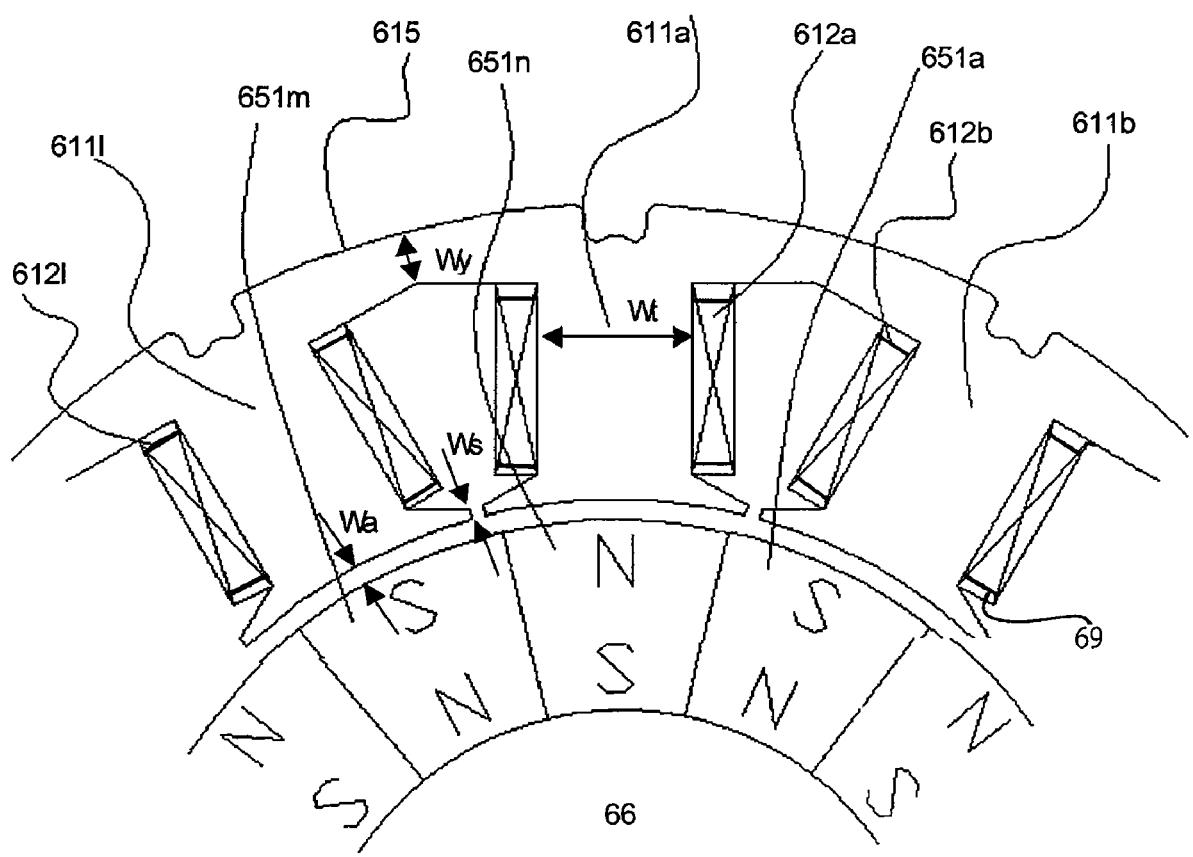
FIG. 10 is an enlarged sectional view of a principal part of the brushless motor as depicted in FIG. 9.

FIG. 10 is an enlarged sectional view of a principal part of the yoke 615 and teeth 611 in the brushless motor 6 as illustrated in FIG. 9. As shown in FIG. 10, the coil 612A is wound around the tooth 611A, for example. Specifically, the coil 612A is wound around a cylindrical bobbin 69 having a guard portion at one axial end thereof and then a regulating plate is press fitted at the other axial end of the bobbin 69. The bobbin 69 with the coil 612A is externally fitted onto the outer periphery of the tooth 611A, whereby the state in which the coil 612A is wound around the tooth 611A is attained. By repeating the similar work, the coils 612A to 612L are wound around the teeth 611A to 611L, respectively. The aforementioned winding way may be called as concentrated winding or pole winding. A portion of each coil that does not form effective magnetic flux is sufficiently eliminated by adopting the concentrated winding in comparison with adopting distributed winding, in which the coil of certain phase is wound around multiple teeth with distributed. Thus, According to the concentrated winding, a copper loss is suppressed, thereby acquiring a brushless motor of high output power capable of being incorporated in the electric power steering apparatus.

Further, similar result can be shown in another exemplified configuration. FIG. 8 is a graph showing property of the output torque rate in case ratio of the yoke width Wy with respect to the tooth width Wt is varied in a 10poles-9slots type brushless motor. As shown in FIG. 8, the output torque rate indicates 100% when the ratio of the yoke width Wy relative to the tooth width Wt is approximately 100%, and the output torque rate shows about 98.4% when the ratio is approximately 35%. Accordingly the deterioration of the output torque rate can be omitted in the range where the ratio of the yoke width Wy with respect to the tooth width Wt is not less than 35%. More specifically, the output torque rate indicates about 98% when the ratio is approximately 32%, whereby deterioration of the output torque rate can be still omitted until the ratio decrease to reach about 32%. However, the ratio decreases to be smaller than this value (35%, or 32%), the output torque rate considerably decreases as the ratio decreases. Thus, in order to prevent the output torque of the brushless motor 6 from deteriorating, it is preferable to set the ratio of the yoke width Wy with respect to the tooth width Wt to be greater than the proximity of 35%, specifically than the proximity 32% or at the vicinity of 32%. In other words, the yoke width Wy is preferable to be equal to or greater than 35% of the tooth width Wt or is equal to or greater than 32%.

As described above, in case of the brushless motor whose slot number is smaller than its pole number, the ratio of the yoke width Wy relative to the tooth width Wt which is preferable for suppressing the deterioration of the torque is about 35% or greater.

5-2 Example 2

Although the motor 6 in the aforementioned embodiment is the 10poles-12slots type brushless motor, the pole number and the slot number of the motor is not limited to these numbers. For example, the brushless motors of 14poles-15slots type, 20poles-21slots type and other type are applicable. In addition, in view of suppression of the cogging torque, it is preferable that the ratio of pole to slot is 2 to 3 (pole:slot=2:3). More preferably the pole number and the slot number is set so that the greatest common measure between them become larger.

In the brushless motor 6 of the aforementioned embodiment, the outer diameter of the stator 61 is 80 mm (millimeter), the outer diameter of the rotor 65 is 50 mm, and the length (thickness) of each of the permanent magnets 651A to 651J is 3 nm. However, the cogging torque and the output torque rate shown in FIGS. 4 to 6 can be obtained in the motor designed so that the outer diameter of the stator is set to be 75 mm to 85 mm, the outer diameter of the rotor is set to be 45 mm to 50 mm, and the length (thickness) of each of the permanent magnet is set to be 2.5 mm to 3.5 mm. Further, similar advantages can be obtained the respective values are set to the vicinity of the above values.

The width of each of the teeth in the circumferential direction can be set to be greater than or at a vicinity of the value which is obtained by dividing outer diameter of the rotor by the number of the teeth and multiplying the result of dividing by π/2. Accordingly, the width of each of the teeth in the circumferential direction is set to be greater than the proximity of the distance (air gap) between adjacent two teeth, whereby the cogging torque is efficiently suppressed.

The width of each of the teeth in the circumferential direction can be set to be greater than or at a vicinity of the value which is obtained by dividing outer diameter of the rotor by the number of the teeth and multiplying the result of dividing by π/2. Accordingly, the width of each of the teeth in the circumferential direction is set to the proximity of the distance (air gap) between adjacent two teeth, whereby the cogging torque is further efficiently suppressed.

In case the number of teeth is greater than the number of the poles formed by the permanent magnets, the thickness of the yoke in radial direction can be equal to or greater than 45% of width of one of the teeth in the circumferential direction. As a result, the cogging torque is suppressed with restraining the deterioration of the output torque.

In case the number of teeth is smaller than the number of the poles formed by the permanent magnets, and thickness of the yoke in radial direction can be equal to or greater than 35% of width of one of the teeth in the circumferential direction. As a result, the cogging torque is suppressed with restraining the deterioration of the output torque.

The embodiment described herein is to be regarded as illustrative rather than restrictive. Plural objects are achieved by the present invention, and there is usefulness in the present invention as far as one of the objects is achieved. Variations and changes may be made by others and equivalent may be employed without departing from spirit of the present invention. Accordingly, it is expressly intended that all variations, changes and equivalents which fall within the spirit and scope of the present invention as defined in the claims be embraced.

We claim:

1. A brushless motor comprising:
an annular stator; and
a rotor having a plurality of permanent magnets alternately arranged in circumferential direction on the rotor to form poles, and disposed within the stator to be rotatable with respect to the stator; wherein the stator includes a cylindrical yoke and a plurality of teeth which are equal in size, are connected to the yoke as to extend therefrom toward the rotor, and are disposed at even intervals in the circumferential direction, and
wherein a cogging torque of the brushless motor is minimized by setting a value for the width of each of the teeth in the circumferential direction substantially equal to the value which is obtained by dividing outer diameter of the rotor by the number of the teeth and multiplying the result of dividing by π/2.

2. The brushless motor according to claim 1, wherein the stator includes twelve teeth and the permanent magnets form ten poles.

3. The brushless motor according to claim 1, wherein the number of teeth is greater than the number of the poles formed by the permanent magnets, and thickness of the yoke in radial direction is equal to or greater than 45% of width of one of the teeth in the circumferential direction.

4. The brushless motor according to claim 3, wherein the thickness of the yoke in the radial direction is about 45% of the width of one of the teeth in the circumferential direction.

5. The brushless motor according to claim 1, wherein the number of teeth is smaller than the number of the poles formed by the permanent magnets, and thickness of the yoke in radial direction is equal to or greater than 35% of width of one of the teeth in the circumferential direction.

6. The brushless motor according to claim 5, wherein the thickness of the yoke in the radial direction is about 35% of the width of one of the teeth in the circumferential direction.

7. An electric power steering apparatus comprising:
a steering device; and
a steering mechanism,
wherein the power steering apparatus further comprises the brushless motor according to claim 1 and the brushless motor is driven in response to operation of the steering device for steering thereby applying steering assist force to the steering mechanism.

8. The brushless motor according to claim 1, wherein proportional difference between the value of the width of each of the teeth in the circumferential direction and the value which is obtained by dividing outer diameter of the rotor by the number of the teeth and multiplying the result of dividing by $\pi/2$ is less than one percent.

9. The brushless motor according to claim 1, wherein the value for the width of each of the teeth in the circumferential direction is between 6.3 mm and 6.7 mm, and the cogging torque is less than or equal to 0.05 Nm.

10. The brushless motor according to claim 1, wherein the value for the width of each of the teeth in the circumferential direction is 6.5 mm.

11. A brushless motor having a reduced cogging torque, comprising:
an annular stator; and
a rotor having a plurality of permanent magnets alternately arranged in circumferential direction on the rotor to form poles, and disposed within the stator to be rotatable with respect to the stator; wherein the stator includes a cylindrical yoke and a plurality of teeth which are same in size one another, are connected to the yoke as to extend therefrom toward the rotor, and are disposed at even interval in the circumferential direction, and
wherein the width of each of the teeth in the circumferential direction is equal to the value which is obtained by dividing outer diameter of the rotor by the number of the teeth and multiplying the result of dividing by $\pi/2$.

* * * * *